Aug. 27, 1935.  F. C. RIBLEY  2,012,637
SPOON
Filed July 18, 1932
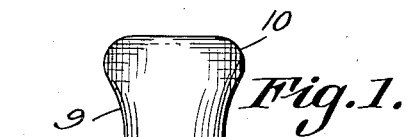
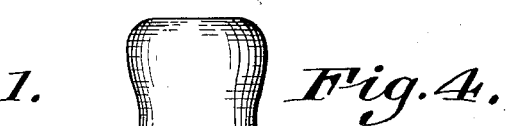
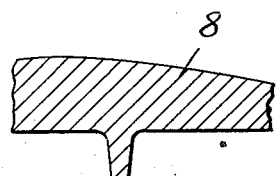
Inventor.
Frank C. Ribley
By C A Snow & Co.
Attorneys.

Patented Aug. 27, 1935

2,012,637

UNITED STATES PATENT OFFICE 2,012,637

SPOON

Frank C. Ribley, Troy, N. Y.

Application July 18, 1932, Serial No. 623,265

1 Claim. (Cl. 30—22)

This invention relates to spoons, and aims to provide a novel form of spoon especially designed for use in cooking, the primary object of the invention being to provide a spoon which may be easily gripped in the hand of the user, without danger of the spoon sliding from the hand.

Another object of the invention is to provide a spoon which may be held in the hands of the user without the necessity of securely gripping the handle of the spoon.

A still further object of the invention is to provide a spoon having a handle of novel construction, means being provided for holding the spoon in an upright position while positioned in a pan or kettle, eliminating any possibility of the spoon falling into the material contained in the pan or kettle.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a rear elevational view of a spoon formed with a handle constructed in accordance with the invention.

Figure 2 is a sectional view taken on line 2—2 of Figure 1.

Figure 3 is a sectional view taken on line 3—3 of Figure 1.

Figure 4 is a rear elevational view of a spoon especially designed for use in removing ice cream or similar frozen confections, from a freezer.

Referring to the drawing in detail, the reference character 5 designates the handle of a spoon, which is formed with the usual bowl 6.

The handle construction which forms the essence of the present invention, is formed with a longitudinal rib 7 disposed at the rear of the handle, the rib extending from the bowl to a point adjacent to the grip 8, thereby insuring a strong and durable handle.

The grip of the handle is bulged as clearly shown by the drawing, and is formed with a reduced portion 9 merging into an enlargement 10, the reduced portion being so located that the small finger of the hand rests therein, when the handle is properly gripped.

Extending rearwardly from the grip 8, is an integral tongue 11, which is disposed near the forward end of the grip, the tongue extending at right angles to the grip, so that it presents a shoulder to rest between the index finger and the second finger of the hand, preventing the spoon from slipping while in use.

This tongue also affords a rest for the spoon to prevent the spoon from falling into the pan or kettle with which the spoon may be used.

It will of course be obvious that when the spoon is positioned in a kettle, or pan, the tongue rests over the upper edge thereof. Longitudinal grooves 14 are formed in the upper surface of the grip 8 to receive the thumb of the hand of the user to prevent the spoon from turning in the hand of the user when the device is used in stirring thick substances. The spoon or paddle shown by Figure 4 of the drawing embodies a blade or bowl 12, and a grip 13, which is also bulged to fit within the hand of the user. Grooves similar to the grooves 14 are formed in the upper surface of the grip 13 to receive the thumb of the hand of the user to prevent turning in the hand.

A tongue 15 is also provided on this grip, and constitutes a rest to be positioned over the upper edge of the pan with which the spoon is used, to support the spoon in an upright position. Grooves 16 are formed on the under side of the grip 13, and provide a roughened surface to receive the ends of the fingers to prevent twisting of the spoon in the hand of the user.

While I have shown and described my invention as applied to a spoon handle, it is to be understood that the handle may be used in connection with carving knives, forks or the like, without departing from the spirit of the invention.

Having thus described the invention what is claimed:

An article of manufacture comprising a bowl and handle section, said handle section having a central bulged portion tapering towards the bowl and free end of the handle, and having a pair of parallel spaced grooves formed in the upper surface of the handle and extending longitudinally thereof, said handle having a pair of spaced parallel grooves formed in the lower side thereof, said handle having an enlargement formed at the free end thereof defining an annular groove adapted to accommodate the little finger of the hand of the user, an integral tongue extending from the rear of the bulged portion of the handle at a point intermediate the ends of the handle and adapted to engage the upper edge of the receptacle in which the spoon is positioned, providing a rest for the spoon.

FRANK C. RIBLEY.